United States Patent
Chen et al.

(10) Patent No.: US 8,719,003 B1
(45) Date of Patent: May 6, 2014

(54) TRANSLATION ACCESS

(75) Inventors: Johnny Chen, Mountain View, CA (US); Steve Langdon, Mountain View, CA (US)

(73) Assignee: Google Inc., Mountain View, CA (US)

( * ) Notice: Subject to any disclaimer, the term of this patent is extended or adjusted under 35 U.S.C. 154(b) by 485 days.

(21) Appl. No.: 13/168,247

(22) Filed: Jun. 24, 2011

(51) Int. Cl.
G06F 17/28 (2006.01)

(52) U.S. Cl.
USPC ............... 704/2; 704/3; 704/4; 704/6; 704/7; 704/8; 726/5

(58) Field of Classification Search
USPC .............................. 704/2–8; 726/5
See application file for complete search history.

(56) References Cited

U.S. PATENT DOCUMENTS

| | | | | |
|---|---|---|---|---|
| 8,244,519 | B2 * | 8/2012 | Bicici et al. ...................... | 704/2 |
| 8,306,840 | B2 * | 11/2012 | Cohen et al. ................... | 705/7.21 |
| 8,311,800 | B1 * | 11/2012 | Delaney et al. .................. | 704/4 |
| 2006/0015320 | A1 * | 1/2006 | Och ................................. | 704/2 |
| 2007/0174040 | A1 * | 7/2007 | Liu et al. .......................... | 704/2 |
| 2008/0082315 | A1 * | 4/2008 | Shimohata et al. ............... | 704/2 |
| 2008/0228464 | A1 * | 9/2008 | Al-Onaizan et al. .............. | 704/3 |
| 2008/0270112 | A1 * | 10/2008 | Shimohata ....................... | 704/3 |
| 2009/0192798 | A1 * | 7/2009 | Basson et al. .................. | 704/270 |
| 2009/0203403 | A1 * | 8/2009 | Gidron et al. .................. | 455/557 |
| 2009/0299724 | A1 * | 12/2009 | Deng et al. ........................ | 704/2 |
| 2011/0277040 | A1 * | 11/2011 | Bliss ............................... | 726/29 |
| 2011/0307245 | A1 * | 12/2011 | Hanneman et al. .............. | 704/4 |
| 2012/0210393 | A1 * | 8/2012 | Yamahara ......................... | 726/2 |
| 2012/0290369 | A1 * | 11/2012 | Acosta-Cazaubon ........ | 705/14.4 |
| 2012/0290556 | A1 * | 11/2012 | Acosta-Cazaubon ......... | 707/711 |
| 2013/0080348 | A1 * | 3/2013 | Pantaliano et al. ........... | 705/347 |

OTHER PUBLICATIONS

Shirali-Shahreza et al., Multilingual Captcha, 2007, Computational Cybernetics IEEE, pp. 135-139.*

Yamamoto et al., Captcha using strangeness in machine translation, 2010, IEEE, pp. 430-437.*

* cited by examiner

*Primary Examiner* — Lamont Spooner

(74) *Attorney, Agent, or Firm* — Remarck Law Group PLC

(57) ABSTRACT

A first test phrase can be rendered to a user in a first language. A first answer phrase in a second language can be received from the user. Based on the determination of that the first answer phrase is a translation of the first test phrase, a second test phrase in the first language can be rendered to the user. A second answer phrase in the second language can be received from the user. A set of parser data can be modified based upon the second answer phrase and the user can be permitted access to a resource.

17 Claims, 3 Drawing Sheets

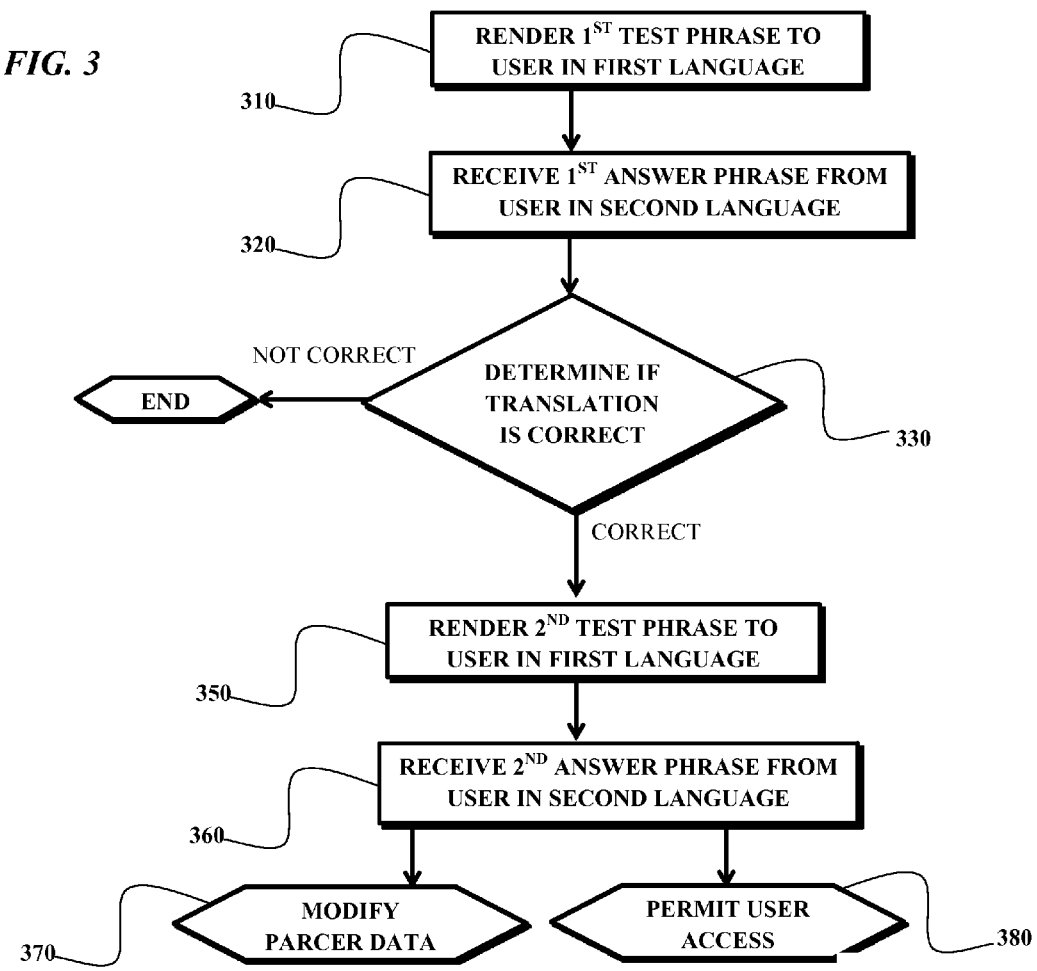

TRANSLATION ACCESS

BACKGROUND

A machine translator can employ computational linguistics to automatically translate a phrase from one natural language to another. Although such translation can be done by substituting words in the one natural language for words in the other, the resulting translations are usually poor because they do not take into account differences in linguistic typology, translation of idioms and the special treatment of linguistic anomalies.

Machine translation can use a technique based on linguistic rules. Rule-based techniques parse a text, usually creating an intermediary, symbolic representation, from which the text in the target language is generated. According to the nature of the intermediary representation, an approach can include interlingual machine translation (e.g., text to be translated is first transformed into an interlingua, i.e., an abstract language-independent representation) or transfer-based machine translation (e.g., applying sets of linguistic rules which are defined as correspondences between the structure of the source language and that of the target language.) These techniques can require extensive lexicons with morphological, syntactic, and semantic information, and large sets of rules.

A parser is a component of a machine translator that analyzes syntax and builds a data structure (often some kind of parse tree, abstract syntax tree or other hierarchical structure) implicit in the input tokens, such as elements of a source language to be translated into a target language. Many modern parsers are at least partly statistical and rely on a corpus of training data which has already been annotated (parsed by hand). This approach allows the parser to gather information about the frequency with which various constructions occur in specific contexts and to construct translation rules. The quality of translations generated by a parser can depend on the quality of parser data. Examples of parser data include phrases, training data, weighting factors, phrase tables, properties of the words, information about the syntactic structure of the phrase (such as dependencies), the grammar, etc., or a combination thereof. A "phrase" can include any number of words, numbers, characters, punctuation or other such entities or combination thereof. Within the parser, a phrase or phrases can be associated with structures and/or additional information (e.g., attributes, etc.) such as hierarchies, rules, parse trees, part-of-speech tags, counts, probabilities, semantic categories, etc., or combinations thereof.

BRIEF SUMMARY

According to an embodiment of the disclosed subject matter, a first test phrase is rendered to a user in a first language. A first answer phrase in a second language is received from the user. Based on the determination of that the first answer phrase is a translation of the first test phrase, a second test phrase in the first language is rendered to the user. A second answer phrase in the second language is received from the user. A set of parser data is modified based upon the second answer phrase. Based on the determination of that the first answer phrase is a translation of the first test phrase, the user is permitted access to a resource.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows a diagram explaining the translation access according to an embodiment of the disclosed subject matter.

DETAILED DESCRIPTION

Figure 1:
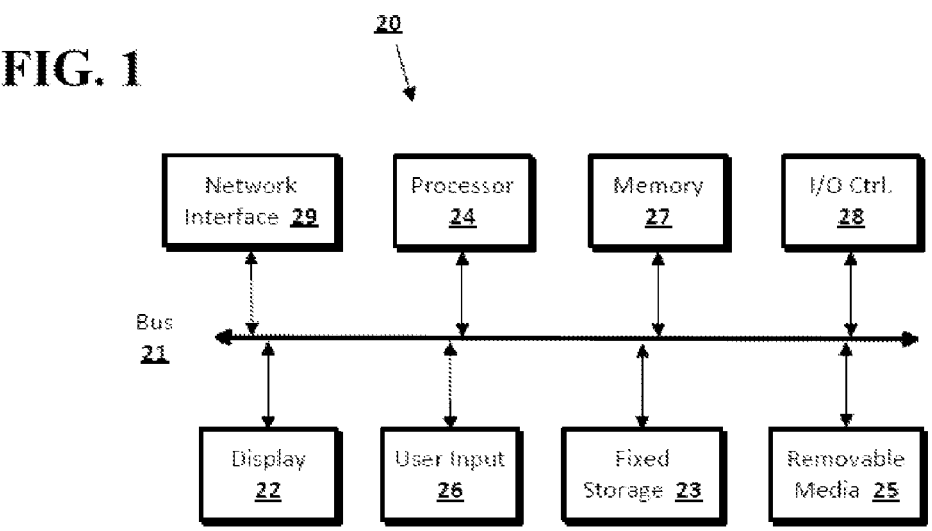
FIG. 1 shows a computer according to an embodiment of the disclosed subject matter.

The quality of parser data can be improved by using the parser to translate a test phrase from one language to another and then compare the translation with a reference translation that is a good reference translation. The parser data can be modified in view of differences between the machine translation and the good reference translation. This can improve the quality of translations rendered by the translator. The greater the number of such training sentences, when based upon good reference data, the better the quality of the parser data and the better the translations.

In accordance with embodiments of the disclosed subject matter, reference translations that can be used to modify parser data can be collected from bi- or multi-lingual users seeking access to resources such as online services, databases, telecommunications services, etc. Some embodiments can further distinguish human users from machine users (such as bots), which can be desirable to prevent machines from accessing resources. For example, some service providers wish to prevent machines from registering for email accounts, trolling auction sites, etc.

Parser data can be modified in various ways, based on the user-input translations. One example of modifying the parser data can be altering the probability of a translation. Table 1 contains probabilities for translations for the English phrase "Hello friend" into Spanish. The second column contains the probabilities of the possible translations of "Hello friend" in Spanish, before a modification is made to the parser data. Thereafter, if a user enters a translation of "Hello friend" in Spanish to be "Hola amigo", the parser data can be modified based on this user-input translation. The third column of Table 1 contains probabilities for possible translations of "Hello friend" after the parser data (i.e. the probabilities in this example) has been modified based on the user-input. As indicated in the third column, the probability that "Hola amigo" is the translation for "Hello friend" has gone up from 0.4 to 0.43, whereas the probability that the translation is any one of the other translations has gone down.

TABLE 1

| Spanish Translation of "Hello Friend" | Probability Prior to Modification | Probability Post Modification |
|---|---|---|
| Hola amigo | .4 | .43 |
| Holla amigo | .3 | .29 |
| Hello amigo | .2 | .19 |
| Hola friend | .1 | .09 |

In some embodiments, a user seeking access to a resource can be presented with a phrase in a first language and asked to provide a translation in a second language. The phrase can be rendered in a form such as distorted text that inhibits it from being accurately read by a machine, but not by a human being. The user can be afforded the opportunity to provide the answer by selecting one of a set of candidate responses in a multiple-choice format, by inputting a translation, by speaking a translation, etc. The user-supplied translation can be compared to a good reference translation. If they are identical or sufficiently similar, then the user can be granted access to the resource and the user-supplied translation can be used to modify parser data to improve the performance of the parser. One or more iterations of this technique may be also used to determine the multi/bi-lingual proficiency of the user. This can be used to properly weight the translations provided by the user for the purpose of modifying parser data.

As shown in FIG. 3, one embodiment of the presently disclosed subject matter presents the user with a first phrase in a first language 310, where a good reference translation of the first phrase to a second language is identified. The phrase can be an image, text, or an audio recording played to the user. The embodiment of the presently disclosed subject matter can receive a translation of the presented first phrase in the second language 320 from the user. The user may input the translated first phrase by selecting a translation from multiple options, by entering the translation manually, by verbally inputting the translation, etc. Using an applicable scoring technique such as, but not limited to, exact match, edit distance, BLEU score, NIST score, Meteor score, etc., or a combination thereof, the implementation can compare 330 the user-input translation to the good reference translation of the first phrase. The user-input translation may be determined to be similar to the good reference translation of the first phrase if the comparison of the user-input translation and good reference translation of the first phrase results in a score which can be above a certain threshold. For example, a user-input translation may be similar to a good reference translation if (good_reference_translation, *, edit distance<0.5), where * is a wildcard that can represent a user-input translation with an edit distance to the good reference translation of less than 0.5.

If the user-input translation and the good reference translation of the first phrase are determined to be similar, then the user may have shown the ability to be able to translate phrases from the first language to the second language 350. Thereafter, the user can be presented with a second phrase in the first language. However, the implementation may not know the correct translation of the second phrase. The implementation can then receive a translation of the presented second phrase in the second language 360. The implementation may use the user's translation of the second phrase in order to train itself to perform better translations. The training may include modifying parser data 370. Data collected from the user's translation may also be used to subsequently generate phrases in either the first or the second language.

In an illustrative example, a user seeking access to a resource can be presented with the phrase "Hello friend" as shown in Table 2. The phrase can be presented as a distorted image rather than simple text such that it can be easy for a human to read it and difficult or impossible for a machine to do so. This can help distinguish between a human user and a machine. Here the first language is English and the good reference translation of "Hello friend" in Spanish is "Hola amigo". The user can be asked to provide a translation of the distorted English phrase in Spanish. This user-input translation can be evaluated to determine if it is similar or not similar to the good reference translation in accordance with embodiments disclosed herein. In this example, the scoring technique used to evaluate similarity is the edit distance between the good reference translation, "Hola amigo", and the user-input translation. If the edit distance is smaller than a predetermined threshold, for example, 0.2, then the user may have shown the ability to be able to translate phrases from English to Spanish. Accordingly, if the user inputs either "Hola amigo", with an edit distance of 0, or "Holla amigo" with an edit distance of 0.1, according to this example the edit distance would be below a predetermined threshold of 0.2. Therefore the user would have shown the ability to translate phrases from the English to Spanish. However, if the user inputs either "Hello amigo" with an edit distance of 0.3, or "Hola friend", with an edit distance of 0.5, according to this example the edit distance would be above a predetermined threshold of 0.2. Therefore the user would not have shown the ability to be able to translate phrases from English to Spanish.

TABLE 2

| First Language Phrase | Second Language Translation | Edit Distance |
|---|---|---|
| Hello Friend | Hola amigo | 0 |
| Hello Friend | Holla amigo | .1 |
| Hello Friend | Hello amigo | .3 |
| Hello Friend | Hola friend | .5 |

If the edit distance is determined to be below the threshold and the user may have shown the ability to translate phrases from English to Spanish, then the user may be presented with a second phrase in English. For example, the user may be presented with "What is your name?" and be asked to provide a translation of that phrase in Spanish. The user-input translation of "What is your name?" in Spanish may be used to train the translator by changing its parser data. In this specific example, the translator may compare the user-input translation to a translator-generated translation. If the two translations are determined to be different, the translator may treat the user-input translation as a good reference translation and then modify its parsing data such that future translations by the translators are more likely to result in translations similar to the user-input translation. If the user-input translation and the translator generated translations are determined to be the same, then no modification to the parser data may be necessary, or, for example, weights may be adjusted to strengthen the existing translation pattern in the parser.

In addition, if the edit distance is determined to be below the threshold and the user may have shown that she is a human, then the user may be granted access to the resource. In some embodiments, the user may be granted access to the requested resource only in the second language.

In some embodiments the threshold for using the user-input translation to modify parser data can be different than the threshold for granting the user access to a resource. For example, as shown in Table 3, if the threshold for determining whether a user may have the ability to translate phrases from English to Spanish is (good_reference_translation, *, edit distance<0.2), then a user-input of "Hello amigo" would not meet the threshold for the ability to translate. Accordingly, inputs by this user would not be used in order to modify the parser data. However, if the threshold for determining whether a user may be granted access to a resource is (good_reference_translation, *, edit distance <0.4), then a user-input of "Hello amigo" would meet the threshold for access.

TABLE 3

| First Language Phrase | Second Language Translation | Edit Distance | Use User-input Translation to Modify Parser Data | Grant Access |
| --- | --- | --- | --- | --- |
| Hello Friend | Hola amigo | 0 | Yes | Yes |
| Hello Friend | Holla amigo | .1 | Yes | Yes |
| Hello Friend | Hello amigo | .3 | No | Yes |
| Hello Friend | Hola friend | .5 | No | No |

In another embodiment of the presently disclosed subject matter, the user can be presented an image where a good reference description of the subject matter of the image in a second language is identified. The subject matter of the image may be anything that can captured in a tangible medium of expression (e.g., image, painting, photograph, etc.) such as an object, living thing, food, action, etc. In this embodiment, the user need not be bilingual. The embodiment of the presently disclosed subject matter may receive a description of the subject matter of the presented image in the second language from the user. Using an applicable scoring technique such as, but not limited to, exact match, edit distance, BLEU score, NIST score, Meteor score, etc., or a combination thereof, the embodiment can compare the user-input description to the good reference description in the second language of the subject matter of the image. The user-input description may be determined to be similar to the good reference description of the subject matter of the image if the comparison of the user-input description and good reference description of the subject matter of the image results in a score which is above a certain threshold. For example, a user-input description may be similar to a good reference description if (good_reference_description, *, edit distance <0.5), where * is a wildcard that can represent a user-input description with an edit distance to the good reference description of less than 0.5.

If the user-input description and the good reference description of the subject matter of the image are determined to be similar, then the user may have shown the ability to be able to communicate in the second language. Thereafter, the user can be presented with a second image. The implementation may identify the description of the subject matter of the second image in a first language. However, the implementation may not know the correct description of the subject matter of the second image in the second language. The implementation can then receive a description of the subject matter of the presented second image in the second language from the user. Then, the implementation may use the user's description of the subject matter of the second image in order to train itself to perform better translations from the first language to the second language. The training may include modifying parser data.

In another embodiment of the presently disclosed subject matter, the user may be assumed to have the ability to translate phrases from the first language to the second language. In this embodiment the user can be presented with a first phrase in a first language. The implementation may not know the correct translation of the first phrase to a second language. The user may then input a translation of the first phrase in the second language. The implementation may use the user-input translation of the first phrase in order to train itself. The training may include modifying parser data. Data collected from the user's translation may also be used to subsequently generate phrases in either the first or the second language.

In another embodiment, the user can be presented with a phrase in a first language, where the translation of the phrase to a second language is previously identified by the implementation. The phrase can be an image, text, or an audio recording played to the user. The user may then input a translation of the presented phrase in a second language. The user may input the translated phrase by selecting a translation from multiple options, by entering the translation manually, or by verbally inputting the translation. Using an applicable scoring technique such as, but not limited to, edit distance, BLEU score, NIST score, Meteor score, etc., or a combination thereof, the organized components then compare the user-input translation to the good reference translation of the phrase. The user-input translation may be determined to be similar to the good reference translation of the phrase if the comparison of the user-input translation and good reference translation of the phrase results in a score which is above a certain threshold. If the user-input translation and the good reference translation of the phrase are determined to be similar, then the user may be granted access as the similar translation is indicative of the user being a human.

In some embodiments, there may be additional iterations of presenting a user with phrases in a first language to be translated into a second language. One mechanism for doing so can be to present the user with phrases in the first language until the user inputs a translation in the second language which is similar to a good reference translation. Accordingly, the user would not be granted access to the resource without being able to provide a good translation.

In some embodiments, the user may be presented with a phrase in more than one language. One mechanism for presenting a phrase more than one language can be by presenting the user with a phrase in a first language and requiring the user to provide a good translation in a second language. Subsequently, presenting the user with a phrase in a third language and requiring the user to provide a good translation in either the first, second, or a fourth language.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
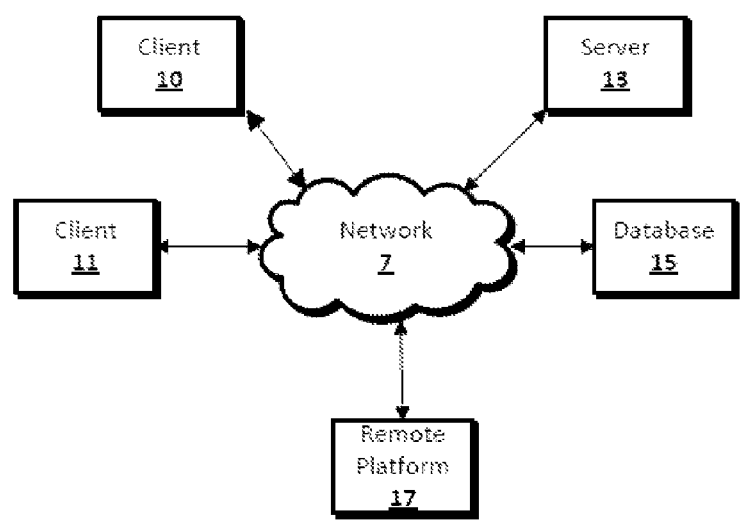
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method, comprising:
rendering to a user a first test phrase in a first language;
receiving from the user a first answer phrase in a second language;
determining, by one or more processors, that the first answer phrase is a translation of the first test phrase;
based on the determining that the first answer phrase is a translation of the first test phrase, rendering to the user a second test phrase in the first language;
receiving from the user a second answer phrase in the second language;
modifying a set of parser data based upon the second answer phrase, wherein based upon the determination that the first answer phrase is a translation of the first test phrase, permitting the user to access a resource.

2. The method of claim 1, wherein the first test phrase is rendered in a form that is human-readable and that is inhibited from being machine-readable.

3. The method of claim 1, wherein the first phrase is rendered as at least one distorted text image.

4. The method of claim 1, wherein receiving from the user a first answer phrase comprises rendering to the user a plurality of multiple choice answer phrase options and receiving from the user a selection of one of the rendered options.

5. The method of claim 4, wherein the determining that the first answer phrase is a translation of the first test phrase comprises determining that the selection received from the user corresponds to a correct translation of the first test phrase.

6. The method of claim 1, wherein the determining that the first answer phrase is a translation of the first test phrase comprises comparing the first answer phrase received from the user with a stored translation of the first test phrase using a metric.

7. The method of claim 6, wherein the determining that the first answer phrase is a translation of the first test phrase further comprises determining an edit distance between the first answer phrase and the stored translation of the first test phrase.

8. The method of claim 7, wherein the determining that the first answer phrase is a translation of the first test phrase further comprises determining that the edit distance between the first answer phrase and the stored translation of the first test phrase is less than an edit distance threshold.

9. The method of claim 1, wherein the resource comprises an online service.

10. The method of claim 1, wherein the modifying a set of parser data based upon the second answer phrase comprises modifying at least one entry in a phrase table.

11. The method of claim 1, wherein the modifying a set of parser data based upon the second answer phrase comprises modifying at least part of a set of parser training data.

12. A device comprising:
a database storing a first test phrase;
a processor in connection with said database, said processor configured to:
render to a user the first test phrase in a first language;
receive from the user a first answer phrase in a second language;
determine that the first answer phrase is a translation of the first test phrase;
based on the determination that the first answer phrase is a translation of the first test phrase, render to the user a second test phrase in the first language;
receive from the user a second answer phrase in the second language;
modify a set of parser data based upon the second answer phrase, wherein the processor is further configured to permit the user to access a resource based upon the determination that the first answer phrase is a translation of the first test phrase.

13. The device of claim 12, wherein the first test phrase is rendered in a form that is human-readable and that is inhibited from being machine-readable.

14. The device of claim 12, wherein the first phrase is rendered as at least one distorted text image.

15. The device of claim 12, wherein the processor is further configured to render to the user a plurality of multiple choice answer phrase options and receive from the user a selection of one of the rendered options.

16. The device of claim 15, wherein the processor is further configured to determine that the selection received from the user corresponds to a correct translation of the first test phrase.

17. The device of claim 12, wherein the processor is further configured to compare the first answer phrase received from the user with a stored translation of the first test phrase using a metric.

* * * * *